United States Patent [19]
Botcherby et al.

[11] 4,123,167
[45] Oct. 31, 1978

[54] OPTICAL DETECTING SYSTEM

[75] Inventors: Stephen C. L. Botcherby, Dorking; Jeremy A. Fitzherbert, Shepperton, both of England

[73] Assignee: Decca Limited, London, England

[21] Appl. No.: 686,687

[22] Filed: May 21, 1976

[30] Foreign Application Priority Data

May 30, 1975 [GB] United Kingdom ............... 23640/75

[51] Int. Cl.² .................. G01B 11/26; G01N 29/00
[52] U.S. Cl. .................................... 356/152; 73/657; 350/269; 350/6.3; 356/28
[58] Field of Search .................. 356/5, 28, 152, 141, 356/29; 343/7 A; 73/627, 655, 657; 350/6, 269

[56] References Cited

U.S. PATENT DOCUMENTS

| 3,435,656 | 4/1969 | Jordan et al. ........................ 73/657 |
| 3,476,483 | 11/1969 | Weeks .................................. 73/655 |
| 3,482,436 | 12/1969 | Neish et al. ......................... 73/657 |
| 3,504,182 | 3/1970 | Pizzurro et al. .................... 356/141 |
| 3,695,761 | 10/1972 | Crosswy et al. ..................... 356/28 |
| 3,809,477 | 5/1974 | Russell ................................ 356/5 |
| 3,809,480 | 5/1974 | Somerville et al. ................. 356/28 |
| 3,811,774 | 5/1974 | Honeycutt et al. ................. 356/28 |

Primary Examiner—S. C. Buczinski
Attorney, Agent, or Firm—Cushman, Darby & Cushman

[57] ABSTRACT

An optical detector of remote vibration, comprising a system for obtaining a Doppler signal by mixing reference light with laser light reflected from a vibrating object. The Doppler signal is rectified and the successively highest value of it are stored. The laser light is scanned over the object and the values of scanning waveforms at the time of storage of a maximum return signal are stored, the stored values being read out to control the direction of the laser light so as to locate the region giving maximum return.

7 Claims, 2 Drawing Figures

OPTICAL DETECTING SYSTEM

FIELD OF THE INVENTION

This invention relates to an optical detecting system in which a beam of coherent light is directed at an object in order to detect the presence or movement thereof. The invention is particularly intended for use in a system in which the vibration of the object is detected by mixing light from the source with light reflected back from the object in order to derive a doppler signal of which the frequency represents the movement of the object.

SUMMARY OF THE INVENTION

The amplitude of a signal which is reflected from an object varies greatly by virtue of irregularities in the reflectivity of the object. One object of the present invention is the provision of a scanning system by means of which an area of the surface of the object can be scanned to determine a region of relatively high or low reflectivity. In a specific form of the invention representation of the position of a region of relatively high reflectivity may be stored and, thereafter, used to control the beam so that it is redirected at that region for, for example, further examination of the object of the movement thereof. For this purpose the beam may be scanned in two directions and representations of signals controlling this scanning may be stored when the amplitude of the received doppler signal, or a signal representing that amplitude, exceeds a stored signal value. It is thereby possible to store a signal representing the maximum amplitude in the doppler signal and the coordinates of the region which yields the maximum amplitude.

BRIEF DESCRIPTION OF THE ACCOMPANYING DRAWINGS

FIGS. 1 and 2 illustrate one embodiment of an optical detector of vibration.

DESCRIPTION OF THE PREFERRED EMBODIMENT

Figure 1:
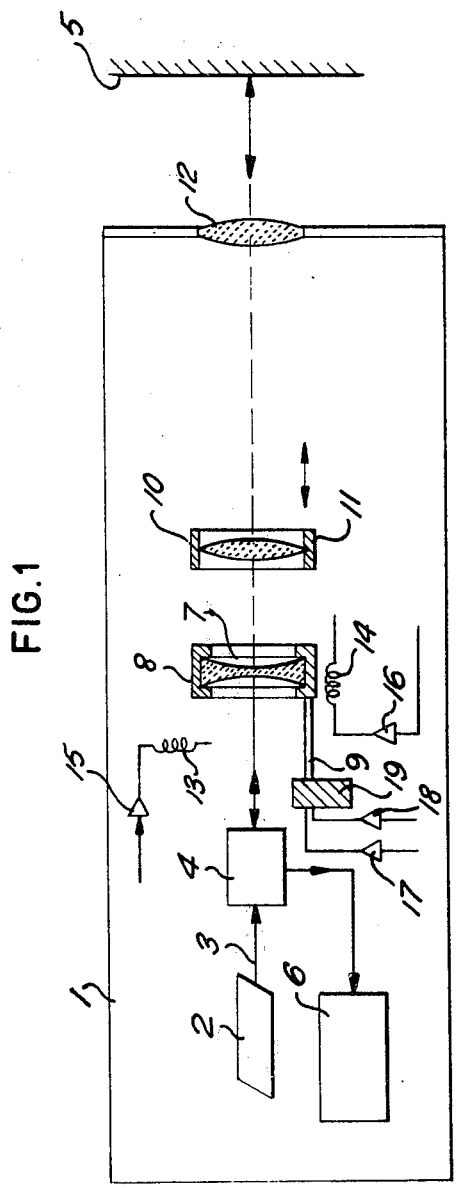

FIG. 1 illustrates the principal parts of a detector of remote movement in which a coherent light beam is directed at an object. The detector is contained within a housing 1 and includes a source of coherent light constituted by a laser 2 which provides a light beam 3 which is directed through an optical system 4 and a focussing system, to be described, at an object 5. The optical system 4, of which the particular construction is not important, is in this particular embodiment arranged to combine the light from the laser with light reflected back from the object in order to form a doppler signal which is fed to a processing system 6. The system 4 may include means for modulating either the light from the laser or the light which is directed at the object in order to introduce between the light beams that are combined a relative frequency shift so as to make the doppler frequency associated with zero movement of the detector relative to the laser a non-zero positive frequency.

The focussing system comprises a lens 7 which is mounted in a canister 8 itself supported on a cantilever 9 extending from a fixed block 19. The purpose of this arrangement is to allow the lens 7 to vibrate or otherwise move in a plane normal to the path of the light beam without moving along that path so that the beam can be scanned over the surface of the object 5 without substantially altering the forcussing of the beam. The optical system further includes a lens 10 which is mounted on a carriage 11 for movement to and fro along the path of the light beam. The optical system finally includes a lens 12 which is fixed in position and preferably forms part of the housing 1. The lens 10 is much weaker than the lens 7, having for example a focal length at least five times longer than that of the lens 7, and is preferably weaker than the lens 12. The focussing system enables the point of focus of the light beam from the laser to be changed from near infinity to very close to the lens 12 by a relatively slight movement of only the lens 10. Thus the mounting of the lens 7 does not have to accommodate movement of the lens 7 along the path of the light beam and the mounting of the lens 12 as part of the wall of the closure is greatly simplified.

The lens 7 may be moved in a plane normal to the path of the light beam by two orthogonal coils 13 and 14. These are diagramatically shown; their axes would usually be in the plane of the paper and into the plane of the paper. The coils 13 and 14 are driven by amplifiers 15 and 16 in order, in this embodiment of the invention, to provide a substantial scanning movement of the light beam over the surface of the object 5. It may be desired to superimpose on the scanning movement of the beam a slight movement such as a circular movement. For this purpose quadrature signals may be applied from amplifiers 17 and 18 to lines which pass along the cantilever 9 to piezo electric drivers, preferably in the form of bimorphs which are spaced apart at 90° intervals around the periphery of the lens 7 and extend in the canister 8 lengthwise thereof. Energisation of each pair of diametrically opposed bimorphs will move the lens relative to the canister 8 in a plane normal to the axis of the light beam.

Figure 2:
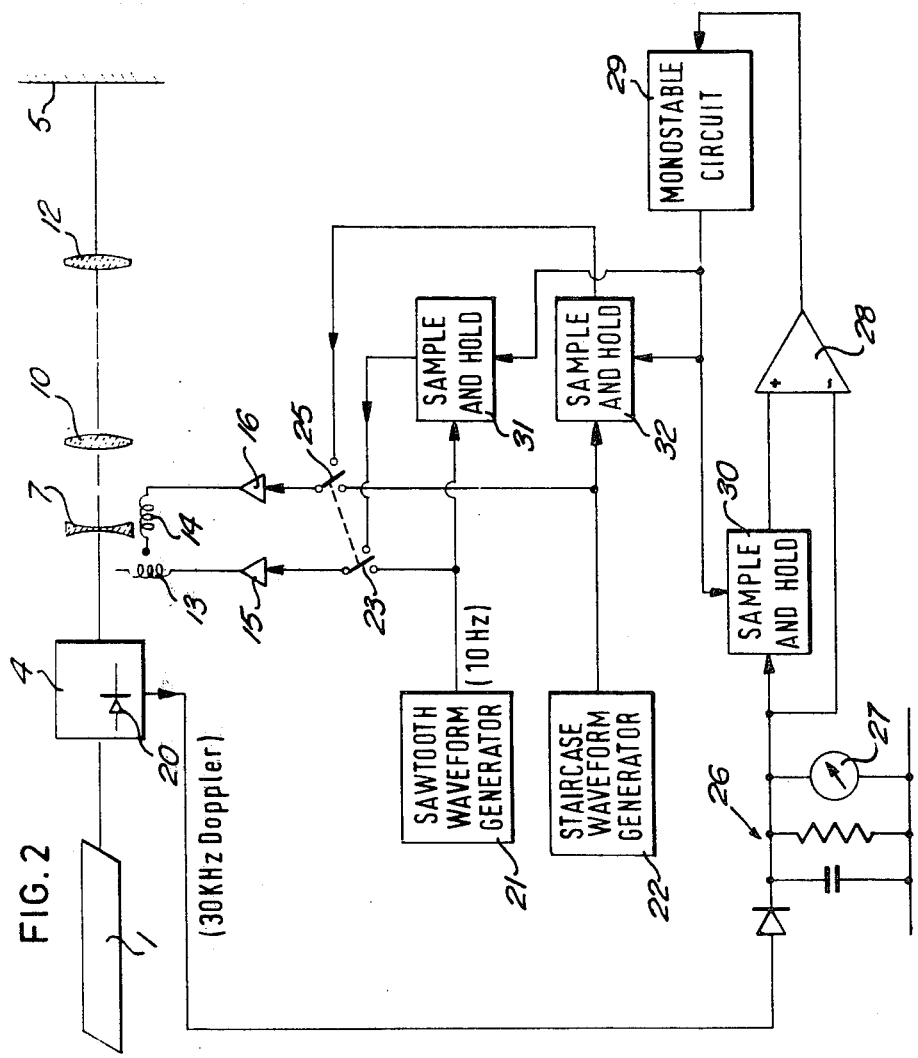

FIG. 2 repeats part of the system of FIG. 1 and principally describes one form of electrical processing circuit. The optical system 4 in this apparatus includes a photodiode 20 at which the doppler signal is developed. It is fed to a detector circuit comprising a series diode and a shunt capacitor and resistor. Across the resistor is developed a rectified and smoothed signal representing the instanteous doppler frequency. This voltage signal is monitored by a voltmeter 27.

The signal from the detector 26 is compared with a stored signal. For this purpose the output of the detector 26 is fed to one input of a comparator 28 which also receives a signal corresponding to the signal stored in a sample and hold store 30. Normally, on setting up the apparatus the sample and hold store would be fed with a zero input. When the stored value is exceeded by the output of the detector 26 the comparator enables the sample and hold store to receive the relatively high output from the detector 26. For this purpose the comparator 28 fires a monostable circuit 29 which feeds a control signal for enabling the sample and hold store to change its stored value. The sample and hold store is enabled for a time such as 100 microseconds.

A signal denoting the maximum received amplitude is stored. It would be possible though not normally required to determine the minimum received amplitude by a similar circuit; in such a case the sample and hold store would initially store a signal denoting a high amplitude for the received doppler signal and the store would be enabled when the received amplitude of the doppler signal fell below that denoted by the stored signal.

In order to aid the determination of the region that yields, in this embodiment, the highest amplitude in the doppler signal, the beam is scanned with the aid of two waveform generators 21 and 22. The generator 21 provides a sawtooth waveform which is fed to the amplifier 15 via a switch 23. The frequency of the sawtooth may be for example of the order of 10 Hz. The purpose of this is to develop a repetitive scan back and forth in one direction over an area of the object. The scan is displaced in a transverse direction by means of a staircase waveform generator 22 which feeds the amplifier 16 and thereby the coil 14. The steps of the staircase which would normally be followed by a flyback to a value corresponding to that at the beginning of the staircase waveform and would be such as to provide for example 100 steps of movement in 10 seconds.

The outputs of the sawtooth waveform generator and the staircase waveform generator are received by stores constituted by sample and hold stores 31 and 32 at the time when the amplitude of the received doppler signal exceeds the value stored in the sample and hold store 30. The monostable circuit 29 opens the sample and hold stores 31 and 32 simultaneously with opening the sample and hold store 30. Accordingly, when a new high value of doppler signal is stored, the sample and hold stores 31 and 32 effectively store signals representing the coordinates of the region which yields that value. The storage process is repeated for any new maximum occurring during the scan, the coordinates stored in the sample and hold stores 31 and 32 being changed each time a new high value is stored in the sample and hold store 30.

At the end of the scanning of the area of the target, the switches 23 and 25, which are preferably ganged together, are changed over so that the position of the lens 7 is controlled by the coordinate values that have been stored. Accordingly the sample and hold stores 31 and 32 feed the amplifiers 15 and 16 and thereby the coils 13 and 14 which deflect the canister 8 for the lens 7 so as to shift the light beam and redirect it to the region yielding maximum returned signal.

It may happen that the region of maximum yield is inconveniently positioned at the edge of the area which is scanned. It is possible to obtain indications not only of the maximum value but of the second highest value by the provision of further sample and hold stores as described and to disable one or more of them at some predetermined point in the scan. However such an arrangement would be substantially more complicated than that which has been described.

We claim:
1. An optical detecting system comprising:
    means for directing a coherent beam of light from a source at an object;
    means for mixing light reflected from the object with light from the source to derive a doppler signal which represents movement of the object;
    means responsive to scanning control signals to provide a reproducible scan of the light beam over a region of the object;
    a detector responsive to the amplitude of said doppler signal to detect a local maximum or minimum signal amplitude thereof;
    means operable in response to the detector to determine the values of the said control signals associated with the local maximum or minimum signal amplitude; means operable to store representations of the control signals when the detector detects said local turning point, and
    means for reading out the said stored representations to substitute them in place of the control signals so as to redirect the said beam at a region, of the said object, that provides the detected local maximum or minimum signal amplitude of the doppler signal.

2. A system according to claim 1, in which the means responsive to the said control signals comprise two orthogonal coils positioned to cause movement of a lens transverse the beam of light.

3. A system according to claim 1, further comprising means for generating scanning control signals, said control signals comprising, for one direction of scanning movement of the said beam, a repetitive saw tooth wave form and, for a transverse direction of scanning movement of the beam, a repetitive staircase wave form.

4. An optical detecting system comprising:
    means for directing a coherent beam of light from a source at an object;
    means for mixing light reflected from the object with light from the source to derive a doppler signal which represents movement of the object;
    means responsive to scanning control signals to provide a reproducible scan of the light beam over a region of the object;
    a detector responsive to the amplitude of said doppler signal to detect a local maximum or minimum signal amplitude thereof including a sample and hold store operable to receive a representation of the doppler signal, means for comparing the contents of the sample and hold store with a corresponding representation of the doppler signal and means for enabling the store to sample and hold a representation of the doppler signal if the instant doppler signal is greater than the doppler signal of which the store already holds a representation; and
    means operable in response to the detector to determine the values of the said control signals associated with the local maximum or minimum signal amplitude.

5. A system according to claim 4 further comprising sample and hold stores which are operative to store samples of the control signals when the first mentioned store is enabled as aforesaid.

6. A system according to claim 5 in which means are provided to rectify the doppler signal to provide the representation thereof.

7. An optical detecting system comprising:
    a source of coherent light;
    means for directing a beam of coherent light from said source at an object;
    means for mixing light reflected from the object with light from the source to derive a doppler signal which represents movement of the object;
    means for providing scanning control signals;
    a first sample and hold store operable to store a representation of said doppler signal;
    means for enabling the store to sample and hold a representation of the said doppler signal when this representation exceeds the stored representation, whereby the local maximum doppler signal is stored;
    second and third sample and hold stores;
    means operable in response to storage by said first store to enable said second and third stores to store representations of the instant scanning control signals;
    scanning means responsive to the scanning control signals to produce scanning movements of said beam; and
    means for reading out stored representations from said second and third stores and feeding these representations in place of the scanning control signals to said scanning means.

* * * * *